United States Patent [19]
Nardone et al.

[11] Patent Number: 5,966,160
[45] Date of Patent: Oct. 12, 1999

[54] IN-LINE FLIP STATION FOR A CARD PRINTING APPARATUS

[75] Inventors: Edward A. Nardone, Wakefield; Christian S. Rothwell, North Kingston, both of R.I.

[73] Assignee: Atlantek , Inc., R.I.

[21] Appl. No.: 08/629,811

[22] Filed: Apr. 10, 1996

Related U.S. Application Data

[63] Continuation-in-part of application No. 08/403,072, Mar. 13, 1995, Pat. No. 5,673,076.

[51] Int. Cl.$^6$ .................................................. B41J 13/00
[52] U.S. Cl. .............................................. 347/218
[58] Field of Search .................................. 347/171, 218; 400/188

[56] References Cited

U.S. PATENT DOCUMENTS

| | | | |
|---|---|---|---|
| 5,600,362 | 2/1997 | Morgavi et al. | 347/218 |
| 5,673,076 | 9/1997 | Nardone et al. | 347/171 |

*Primary Examiner*—Huan H. Tran
*Attorney, Agent, or Firm*—Barlow, Josephs & Holmes

[57] ABSTRACT

An apparatus for printing and laminating plastic cards consists of a thermal transfer printing station including ribbon and a thermal printhead for printing an image on a receptor surface of a receptor card, a laminating station including laminating film and a heated laminating roller mounted for engagement with the receptor surface of the receptor card during a laminating operation, and a guided carriage for transporting the receptor card beneath the printhead and the heated laminating roller. The carriage includes a resilient surface for receiving the receptor card with a receptor surface facing upwardly. The carriage is guided on a pair of rails to insure proper registration and tracking of the receptor card. The carriage is driven by a threaded rod which passes through a threaded bore in the carriage wherein rotation of the threaded rod by a motor causes movement of the carriage along the guide rails. In an alternate embodiment, the apparatus further includes an in-line flip station for reversing the print surface of the card so that printing can be accomplished on both sides of the card.

5 Claims, 17 Drawing Sheets

IN-LINE FLIP STATION FOR A CARD PRINTING APPARATUS

CROSS-REFERENCE TO RELATED APPLICATIONS

This application is a continuation-in-part of U.S. application Ser. No. 08/403,072 entitled CARD PRINTING AND LAMINATING APPARATUS filed Mar. 13, 1995, now U.S. Pat. No. 5,673,076, commonly assigned with the present invention.

BACKGROUND AND SUMMARY OF THE INVENTION

The instant invention relates to apparatus for printing identification cards, and more particularly to an in-line transport system for transporting a receptor card through a series of in-line cleaning, printing, and laminating stations.

Card printing apparatus have heretofore been known in the art. In this regard, the prior card printing apparatus have primarily utilized successive nip rollers to transport a receptor card through a printing station for printing. While the prior art devices have served their intended purpose for the most part, the devices nevertheless have several shortcomings which have thwarted their widespread acceptance.

In response to the shortcomings of the prior art, the instant invention provides an improved transport system including a threaded rod-driven carriage for transporting the receptor card through successive cleaning, printing and laminating stations of the apparatus. In a second embodiment, the apparatus includes an in-line flip station for reversing the receptor card so that printing can be accomplished on both the front and back surfaces of the receptor card.

The apparatus includes a hopper for storing a plurality of receptor cards to be printed, a cleaning station for cleaning the receptor surface of the card, a printing station for printing am image onto the receptor surface of the card, a laminating station for applying a laminating film over the printed image on the card, and a threaded rod-driven card carriage for transporting the receptor card through the successive stations of the apparatus. The carriage includes a resilient card receiving surface for receiving the receptor card with a receptor surface facing upwardly. The carriage is guided through the successive in-line stations on a pair of guide rails. Movement of the carriage along the guide rails is accomplished by a threaded rod which passes through an inwardly threaded cylinder in the carriage body, and a reversible drive motor which is operative for rotating the threaded drive rod. In use, the carriage is first driven beneath the hopper wherein a single receptor card is removed from the hopper and received onto the receiving surface of the carriage. The carriage is then driven to the cleaning station wherein receptor card is passed beneath a silicone roller mounted for rolling engagement with the upwardly facing surface of the receptor card. The card is then transported beneath a thermal printhead wherein a thermal transfer ribbon passes intermediate the printhead and the receptor surface of the receptor card. The transfer film includes a plurality of colored panels recurring in a repetitive pattern. In order to achieve a full color image on the surface of the card, the card must be passed underneath the printhead three separate times for successive printing of each of the colored ribbon panels, i.e. cyan, magenta, and yellow. The carriage then transports the receptor card beneath a laminating station including a laminating film supply and a heated laminating roller mounted for engagement with the surface of the card. The laminating film passes intermediate the roller and the card surface during the laminating operation for overlaying the laminating film onto the printed surface of the card. The carriage then transports the card to an output station for output to the operator.

It has been found in the industry that it would be advantageous in certain applications to be able to print on both the front and back surfaces of the card. For example in creating identification cards, it is preferable to be able to print information on both the front and back surfaces of the card. Accordingly, in an alternate embodiment of the apparatus, the transport system further includes a flip station for reversing, or flipping the card, after a first printing operation, so that printing can also be accomplished on the reverse side of the card. In this regard, the flip station is preferably located between the printing station and the lamination station so that the card can be flipped over after a printing operation and then fed back into the printer for a second printing operation. More specifically, in a first pass through the printing station, the card surface would be printed using a single color, such as black to create a back surface of the card. To accomplish printing in black, the thermal transfer ribbon is provided with an additional black panel located between each set of successive color panels. As the card exits the printing station, the card is fed into the flip station for reversing the surface of the card. More specifically, the carriage moves the card between a pair of opposing guide channels which are biased inwardly to grasp the opposing side edges of the card. These guide channels are supported on a block assembly which is then lifted upwardly by a cam mechanism driven by a stepping motor thereby lifting the card off of the receiving surface of the carriage. When the block assembly is in an upper position, the guide channels are rotated 180 degrees by another stepping motor located on the block assembly to reverse the sides of the card. The block assembly is the lowered back into the normal in-line position wherein the card is returned to the receiving surface of the carriage with the unprinted surface of the card now facing upwardly. The carriage is then driven back through the printing station three successive time to achieve a full color print image on the upwardly facing surface of the card thereby creating a front surface of the card. The card is then passed through the laminating station to laminate the front surface of the card, and output to the user.

Accordingly, among the objects of the instant invention are: the provision of a card printing apparatus operative for printing on both front and back surfaces of a receptor card; the provision of an in-line transport system including a threaded rod driven carriage assembly for transporting the receptor card through a series of successive in-line stations; and the provision of an in-line transport system including an in-line flip station for reversing the printing surfaces of the card so that printing can be accomplished on both the front and rear surfaces of the card.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

Figure 1:
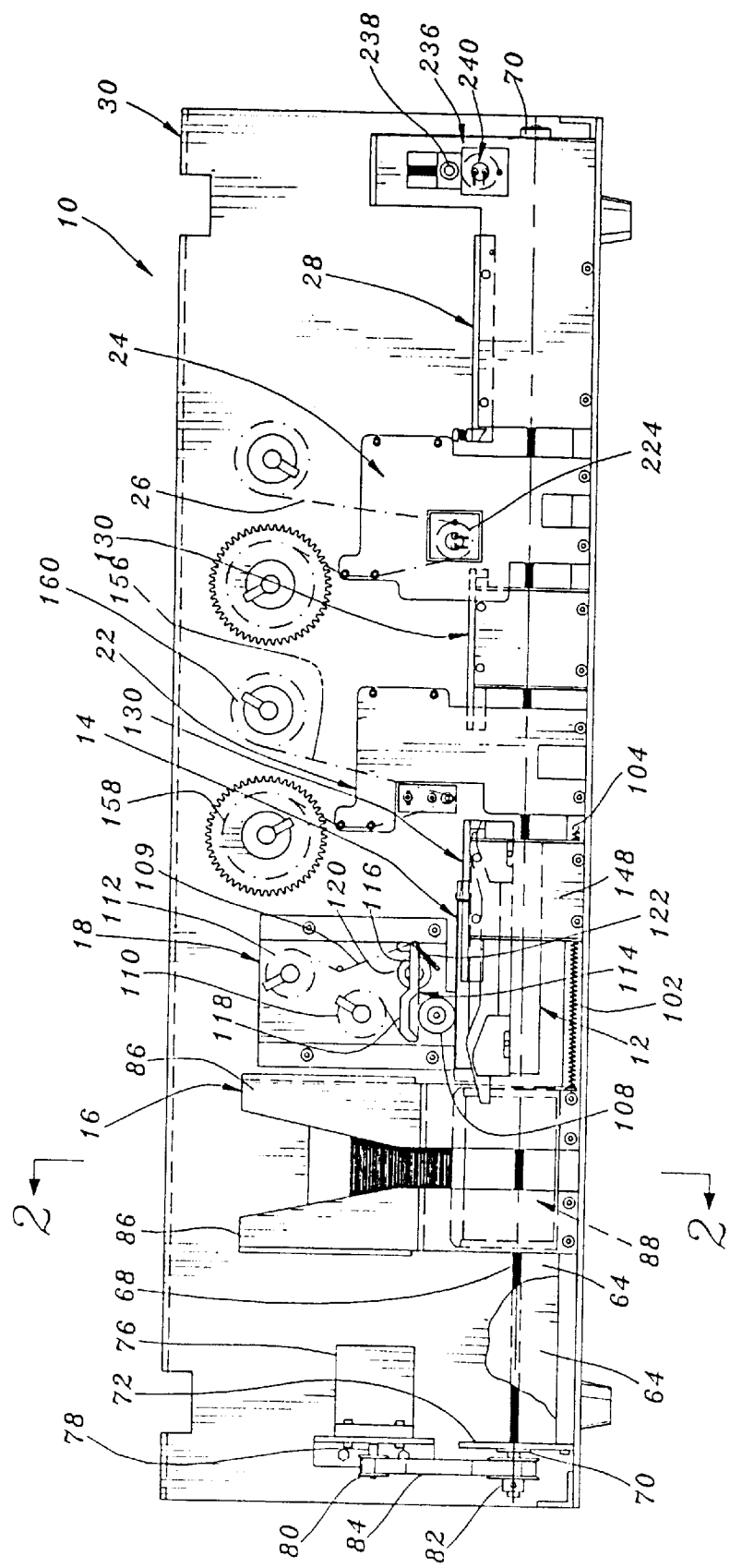
FIG. 1 is a side elevational view of the apparatus of the instant invention.

DESCRIPTION OF THE PREFERRED EMBODIMENT:

Referring now to the drawings, the card printing apparatus of the instant invention is illustrated and generally indicated at 10 in FIG. 1. As will hereinafter be more fully described, the instant invention provides a threaded rod driven carriage assembly generally indicated at 12 for transporting a receptor card 14 through successive cleaning, printing and laminating stations of the apparatus 10. The receptor card 14 preferably comprises a rigid plastic, such as polyvinylchloride (PVC).

More specifically, the apparatus 10 includes a hopper assembly generally indicated at 16 for storing a plurality of receptor cards 14 to be printed, a cleaning assembly generally indicated at 18 for cleaning a receptor surface 20 of the receptor card 14, a printhead assembly generally indicated at 22 for printing an image onto the receptor surface 20 of the receptor card 14, a laminating roller assembly generally indicated at 24 for applying a laminating film 26 over the printed image on the receptor surface 20 of the receptor card 14, and an exit station generally indicated at 28 for outputting the receptor card 14. Each of the above-described assemblies is mounted on a substantially rigid frame structure generally indicated at 30.

Figure 3:
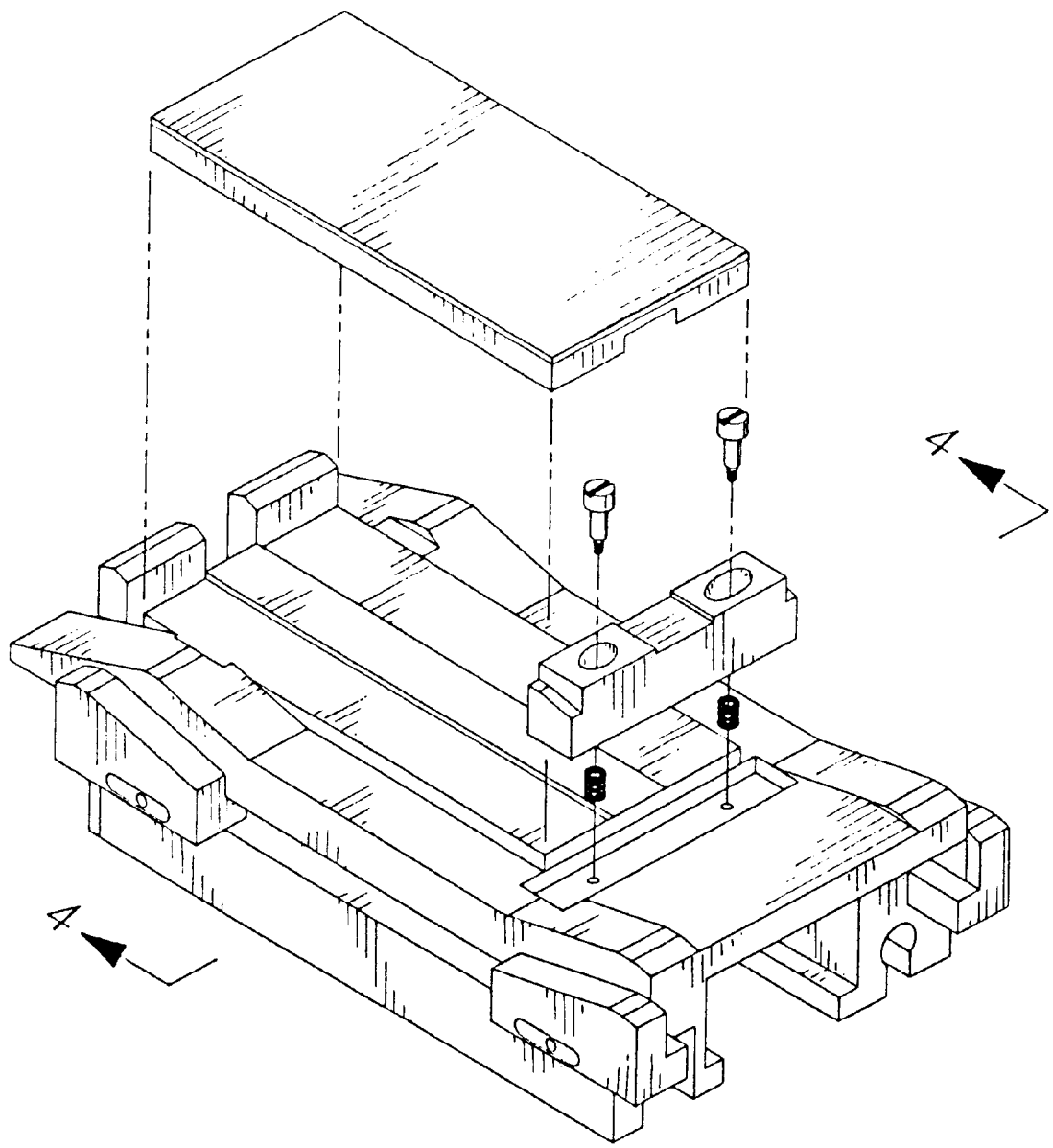
FIG. 3 is an exploded perspective view of the carriage assembly showing the card platen and stop block.
Figure 4:
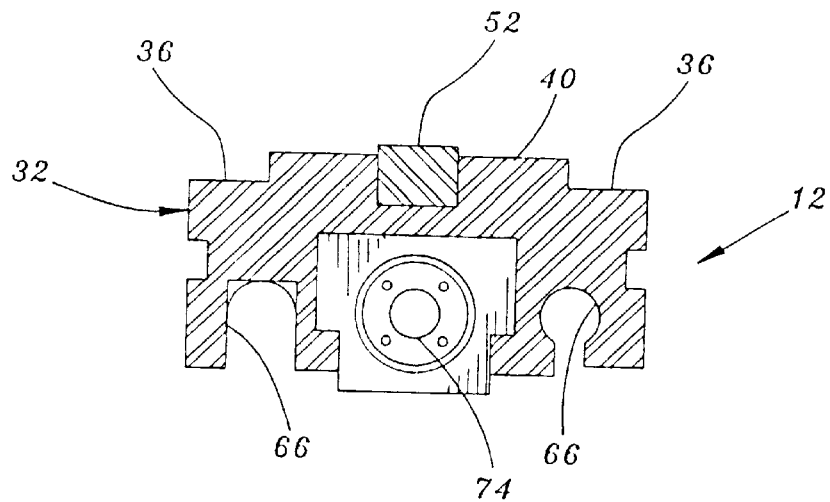
FIG. 4 is a cross-sectional view thereof taken along line 4—4 of FIG. 3.

Referring to FIGS. 3–4, the carriage assembly 12 comprises a body portion generally indicated at 32, and a card platen generally indicated at 34. The body portion 32 is generally rectangular in configuration and includes integrally formed symmetrical cam surfaces 36 extending from the front to the rear end of the body portion 32 along the side edges thereof. The cam surfaces 36 are operative for lifting and lowering the printhead assembly 22, which operation will be described hereinafter. Symmetrical cam blocks 38 are attached to the sides of the carriage body 32 to form a second set of cam surfaces 39 at the front and rear of the carriage body 32 for lifting and lowering the laminating roller assembly 24. The card platen 34 is received onto an upper surface 40 of the carriage body 32 between a pair of upwardly extending spaced projections 42 at the rear of the carriage body 32 and a stop block 44 mounted adjacent the front of the carriage body 32. The card platen includes a rigid plate 46 having a longitudinal groove 48 in the underside thereof, and a resilient card receiving surface 50 for receiving the receptor card 14 with the receptor surface 20 facing upwardly. The rigid plate 46 is received onto the upper surface 40 of the carriage body 32 wherein the longitudinal groove 48 is guided along a longitudinal ridge 52 formed thereon. The longitudinal distance between the projections 42 and the stop block 44 is slightly longer than the card platen 34 to allow some longitudinal movement of the card platen 34 with respect to the carriage body 32. The stop block 44 is mounted in a recess 54 in the carriage body 32 by means of two threaded fasteners 56 received through openings 58 in the stop block 44 and into threaded bores 60 positioned within the recess 54. The stop block 44 is normally biased to an upwardly extending position by means of springs 62 received around the threaded fasteners 56 and captured between the bottom of the stop block 44 and the carriage recess 54. The height of the rear projections 42 and the stop block 44 is slightly more that the height of the card platen 34 so that when a card 14 is received on top of the card receiving surface 50, the receptor surface 20 of the card 14 is within the same plane as the top of the projections 42 and stop block 44.

Figure 2:
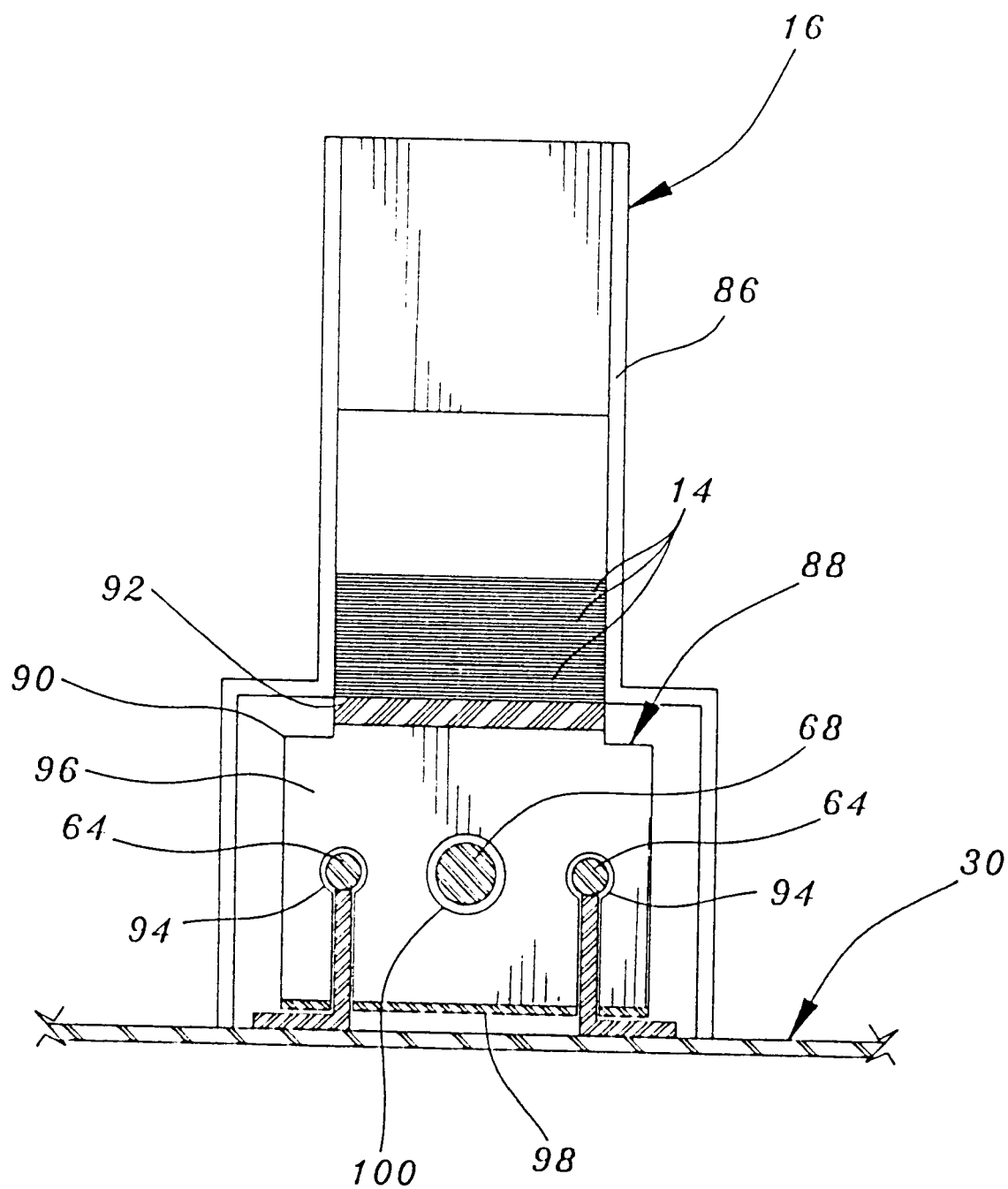
FIG. 2 is a cross-sectional view thereof taken along line 2—2 of FIG. 1.

The carriage 12 is guided through the successive stations of the apparatus 10 on a pair of parallel guide rails 64 which are secured to the frame 30 of the apparatus 10. The guide rails 64 extend through parallel grooves 66 formed along the bottom of the carriage body 32. The carriage 12 is driven by a threaded rod 68 rotatably mounted in bearing assemblies 70 attached to vertical walls 72 at the ends of the frame 30. The threaded rod 68 is positioned between the two guide rails 64 (See FIG. 2) and passes through an inwardly threaded cylinder 74 mounted in the center of the carriage body 32.

A reversible motor 76 (FIG. 1) is operative for rotating the threaded drive rod 68 for forward and backward movement of the carriage 12 along the guide rails 64. More specifically, the drive shaft 78 of the motor 76 includes a first pulley 80 and the end of the threaded rod 68 includes a second pulley 82. A drive belt 84 is extended around the two pulleys 80, 82 to transfer rotation of the drive shaft 78 to the threaded rod 68.

The hopper assembly 16 comprises two sheet metal formations 86 which cooperate to define a vertically disposed, generally rectangular chute in which a plurality of horizontally disposed receptor cards 14 are maintained in stacked relation. The bottom portion of the hopper 16 is open in the longitudinal direction to allow longitudinal movement of a truck assembly generally indicated at 88 beneath the stacked cards 14. The truck assembly 88 (FIG. 2) comprises a U-shaped sheet metal body portion 90 which is slidably mounted on the guide rails 64, and further comprises a top plate 92. More specifically, the guide rails 64 pass through slotted cutouts 94 in the end walls 96 and bottom wall 98 of the truck 88. The threaded drive rod 68 passes through openings 100 in the end walls 96 of the truck 88. The truck 88 is normally disposed directly beneath the stacked cards 14 wherein the top plate 92 engages the lowermost card to maintain the cards 14 within the hopper 16. The truck 88 is not actuated by the threaded rod 68, however, it is spring biased for forward movement (movement to the right in FIG. 1) along the guide rails 64. In this regard, one end of a spring 102 (FIG. 1 broken lines) is attached to the front end of the truck 88 while the other end is attached to a rod 104 (broken lines) extending between the guide rails 64 adjacent the printhead assembly 22 in the center of the apparatus 10. Forward movement of the truck 88 past the front wall of the hopper is prevented by a stop arm (not shown) so that the truck 88 is normally positioned directly beneath the hopper 16.

In operation, the carriage 12 is normally disposed directly to the right of the hopper 16, as illustrated in FIG. 1. In order to pick a card 14 from the hopper 16 for printing and lamination, the carriage 12 is driven rearwardly (to the left in FIG. 1), so that it passes underneath the hopper 16. Movement of the carriage 12 to the left displaces the truck 88 to the left along the guide rails 64. During movement of the truck 88, the card platen 34 is positioned directly beneath the lowermost card. As stated previously, the rear projections 42 on the carriage 12 extend upwardly slightly above the surface 50 of the card platen 34. Accordingly, when the rear projections 42 are moved completely to the left of the hopper 16, i.e. out from underneath the lowermost card, the lowermost card is dropped onto the card receiving surface 50 of the platen 34 with the rear projections 42 now engaging the rear edge of the card 14. The rear edge of the rear projections 42 are provided with a slight chamfer 106 toward the rear to facilitate rearward movement of the carriage 12 beneath the card 14 in the hopper 16. In this manner, a single receptor card 14 is removed from the hopper 16 and positioned on card platen 34.

Figure 5:
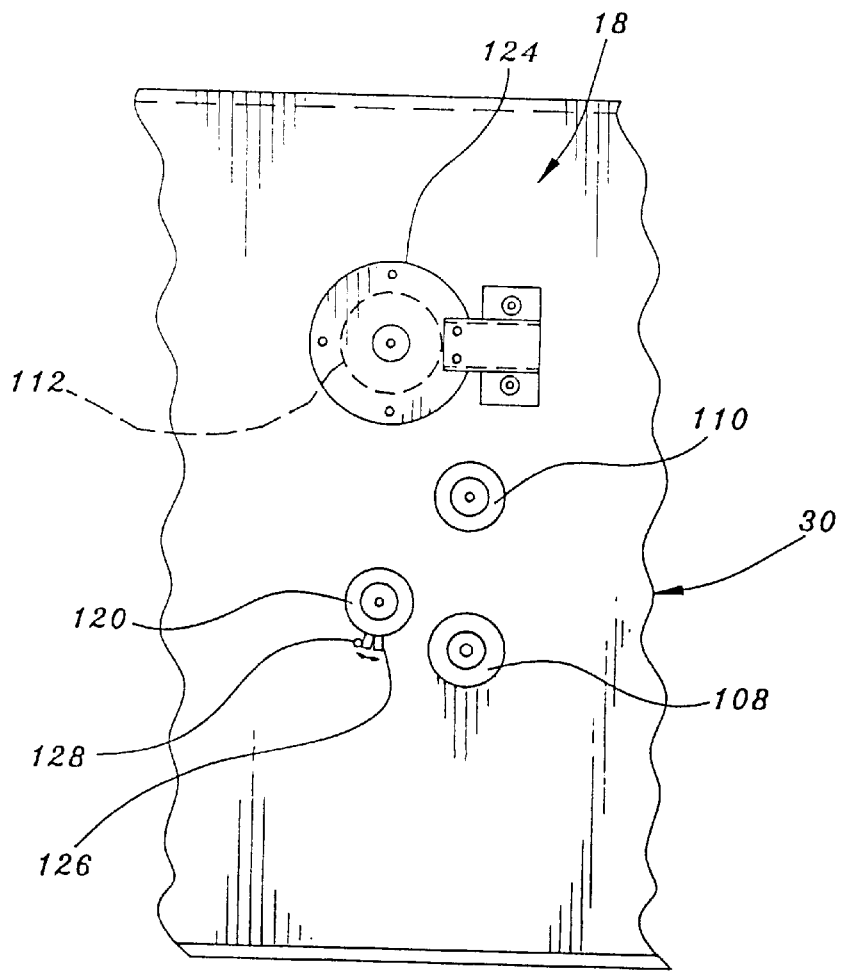
FIG. 5 is a rear view of the cleaning station.

The carriage 12 is then driven forwardly toward the cleaning assembly 18. Since the card truck 88 is spring biased for forward movement, the truck 88 will follow the carriage 12 back into its normal position beneath the hopper 16 as the carriage 12 moves toward the cleaning station 18. As the carriage 12 moves forwardly, the receptor card 14 is passed beneath a silicone roller 108 rotatably mounted to the frame 30 so that the outer surface thereof makes rolling engagement with the receptor surface 20 of the receptor card 14. The silicone roller 108 is conventionally operative for lifting dirt and dust particles from the surface of the receptor card 14 to provide a clean surface for printing and laminating. As is well known in the art, silicone rollers become dirty very quickly and need to be cleaned with an adhesive tape 109 to remove the dirt and dust from the outer surface of the roller. Cleaning of the silicone roller 108 is accomplished by means of a tape assembly including a tape supply roll 110, a tape take up roll 112, and a pivot arm 114. The pivot arm 114 comprises a flat planar panel having a width generally equal to the length of the silicone roller 108, i.e. about the same as the width of the receptor card 14. The arm 114 includes a planar first portion 116 and a generally arcuate end portion 118. The first portion 116 is rotatably mounted to the frame 30 on a bearing assembly 120 so that the end portion 118 is situated directly above the silicone roller 108. The tape 109 winds off of the supply roll 110 and around the pivot arm 114 and onto the take up roller 112 generally as illustrated in FIG. 1. The pivot arm 114 is normally biased by a spring 122 to a first position wherein the tape 109 is not in engagement with the roller 108. However, when it is needed to clean the surface of the roller 108, the take up roll 112 is rotated by a motor 124 (FIG. 5). Winding of the tape 109 onto the take up roll 112 tensions the tape 109 and causes the pivot arm 114 to pivot about the bearing assembly 120 wherein the tape 109 at the end portion 118 of the arm 114 moves into engagement with the roller 108. Downward movement of the pivot arm 114 is controlled by a pin 126 mounted on the pivot shaft 120. The pin 126 engages a stop pin 128 on the frame 30 to limit rotation of the pivot shaft 120 (FIG. 5). After a complete revolution of the silicone roller 108, the tape 109 is disengaged from the roller 108. In normal operation of the apparatus 10, the silicone roller 108 is cleaned after every five to ten card cleanings.

Figure 11:
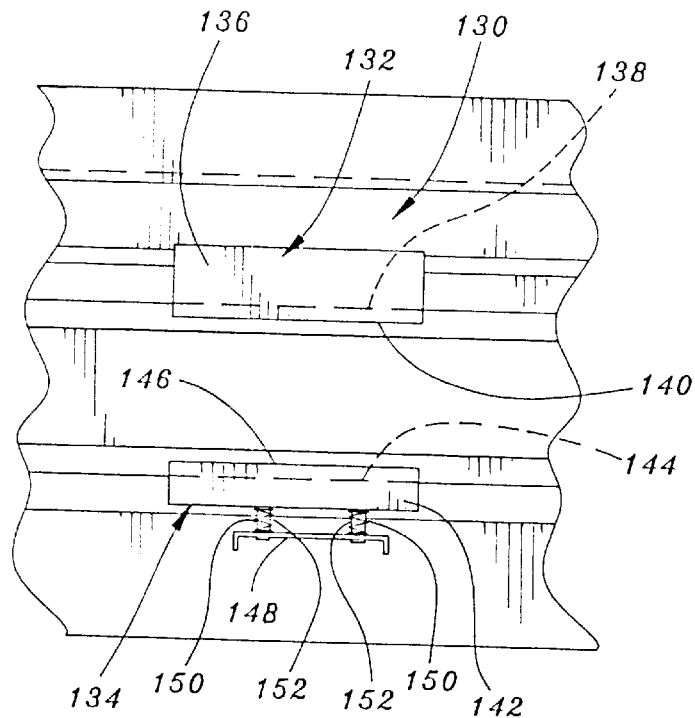
FIG. 11 is a top view of the card guide assembly for guiding the card into the print station.

The carriage 12 is further driven to the right so that the card is transported beneath the printhead assembly 22. However, prior to passing beneath the printhead assembly 22, the card is passed through a card guide assembly 130. Referring to FIG. 11, a top view of the guide assembly 130 is illustrated in top view. The guide assembly 130 comprises an inner fixed guide rail 132 and an outer spring biased guide rail 134. The inner rail 132 has a body portion 136 with a vertical side edge 138 (broken lines) operable for engaging the side edge of the card 14, and further has a horizontally extending ledge portion 140 extending inwardly from the body portion 136 to engage the top surface of the card 14. The inner guide rail 132 is securely mounted to the frame 30. The outer guide rail 134 also has a body portion 142 with a vertical side edge 144 (broken lines) operable for engaging the side edge of the card 14, and also has a horizontally extending ledge portion 146 extending inwardly from the body portion 142 to engage the top surface of the card 14. The outer guide rail 134 is slidably mounted to a sheet metal wall 148 by rods 150. Spring 152 are captures between the guide rail body 142 and the sheet metal wall 148 to bias the guide rail 134 inwardly. As the carriage 12 is driven to the right, the card 14 passes beneath the ledge portions 140, 146 and between the body portions 136, 142. The spring biased outer rail 134 squeezes the card 14 against the inner rail 132 to frictionally move the card 14 rearwardly on the carriage 12 into firm engagement against the rear projections 42 of the carriage 12. The guide assembly 130 thus positions the card 14 in the rearwardmost possible position on the carriage 12. This position is necessary for proper alignment and positioning of the printed image onto the card surface 20.

Figure 6:
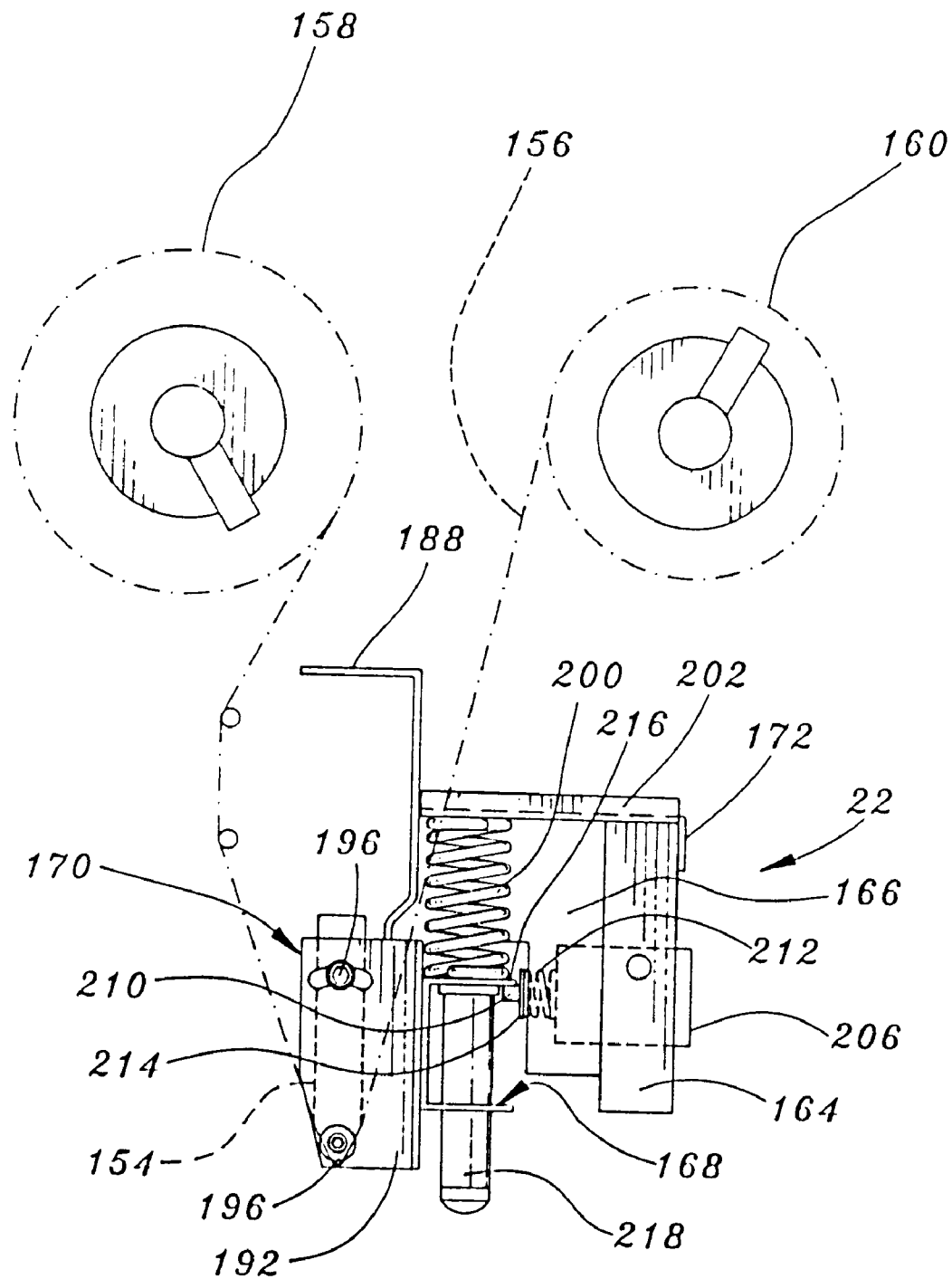
FIG. 6 is an enlarged side elevational view of the printing assembly.
Figure 7:
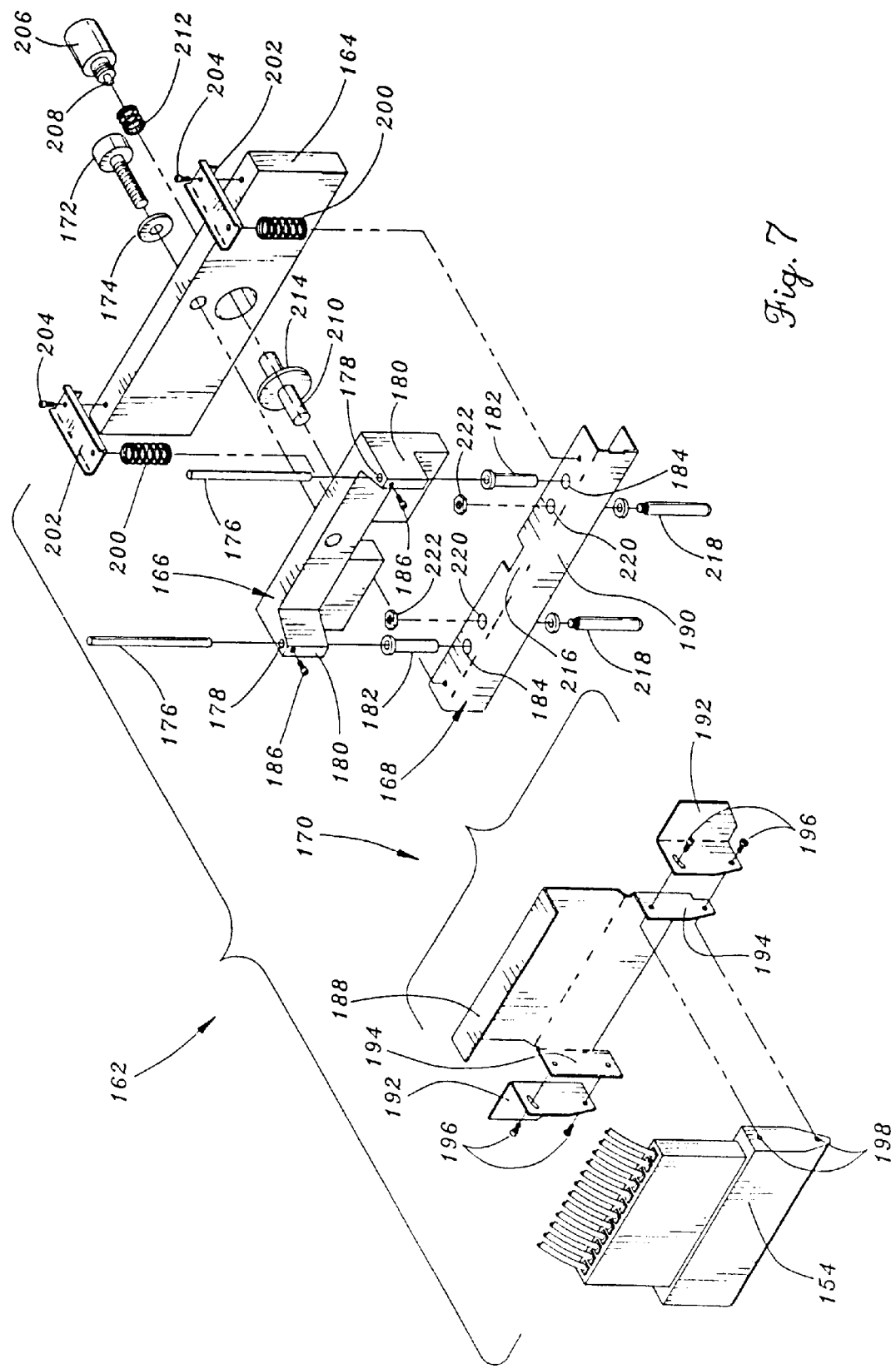
FIG. 7 is an exploded perspective view thereof.

Referring to FIGS. 6–10, the printhead assembly 22 utilizes an edge-type thermal printhead 154 for printing an image onto the receptor surface 20 of the receptor card 14. The thermal print assembly 22 uses a conventional thermal dye transfer printing method wherein a thermal transfer ribbon 156 passes intermediate the printhead 154 and the receptor surface 20 of the receptor card 14 for thermally transferring die from the ribbon 156 onto the receptor surface 20 of the card 14. The transfer ribbon 156 is supplied by a ribbon supply assembly including a supply roll 158, and a take-up roll 160. The take-up roll 160 is driven in a conventional manner by a stepper motor (not shown) to take up used ribbon. The ribbon 156 includes a plurality of colored panels reoccurring in a repetitive pattern. In order to achieve a full color image on the receptor card 14, the card 14 must be passed underneath the printhead 154 three separate times for successive printing of each of the colored ribbon panels, i.e. cyan, magenta, and yellow. In this regard, the printhead 154 is movable between a printing position wherein the printhead 154 is positioned for engagement with the receptor surface 20 of the receptor card 14, and an idle position wherein the printhead 154 is lifted out of engagement with the receptor card 14. More specifically, the printhead 154 is mounted on a mounting assembly 162 (FIG. 7) including a rigid support arm 164, a mounting block generally indicated at 166 pivotably mounted to the support arm 164, a channel member 168, and a carrier assembly generally indicated at 170. The mounting block 166 is pivotably mounted to the support arm 164 by means of a threaded fastener 172 and washer 174. The channel member 168 is slidably mounted to the pivot block 166 by dowels 176 which pass through openings 178 in arm portions 180 of the pivot block 166 and through sleeves 182 which are mounted in openings 184 in the channel member 168. The guide dowels 176 are locked in position by means of set screws 186. The channel member 168 is thus slidably movable up and down along the dowels 176 with respect to the pivot block 166. The carrier assembly 170 includes a back plate 188 which is fixedly mounted to the front wall 190 of the channel member 168 and two side panels 192 which are mounted to side walls 194 of the back plate by fasteners 196. The fasteners 196 pass through the sidewalls 192, 194 and into threaded openings 198 in the sides of the printhead 154 to mount the printhead 154 in the carrier assembly 170. The mounting assembly 162 includes springs 200 for normally biasing the printhead 154 downwardly to the printing position. More specifically, the springs 200 are captured between mounting arms 202 mounted by fasteners 204 to the top of the support arm 164 and the end portions of the channel member 168. Since the support arm 164 is fixed in position, the springs 200 effectively push the channel member 168 downwardly along the guide dowels 176. However, the printhead 154 is selectively maintained in an idle position by a solenoid 206 mounted in the pivot block 166. The solenoid 206 is conventional in the art, having a plunger 208 which is drawn inwardly in response to electric current. A capture pin 210 is mounted on the end of the solenoid plunger 208, and a spring 212 is captured between a flange 214 on the capture pin 210 and the solenoid body 206 to normally bias the pin 210 to a fully extended position. Referring to FIG. 6, when the capture pin 210 is fully extended, it projects beneath the upper wall 216 of the channel member 168 to prevent downward movement of the printhead 154.

Figure 8:
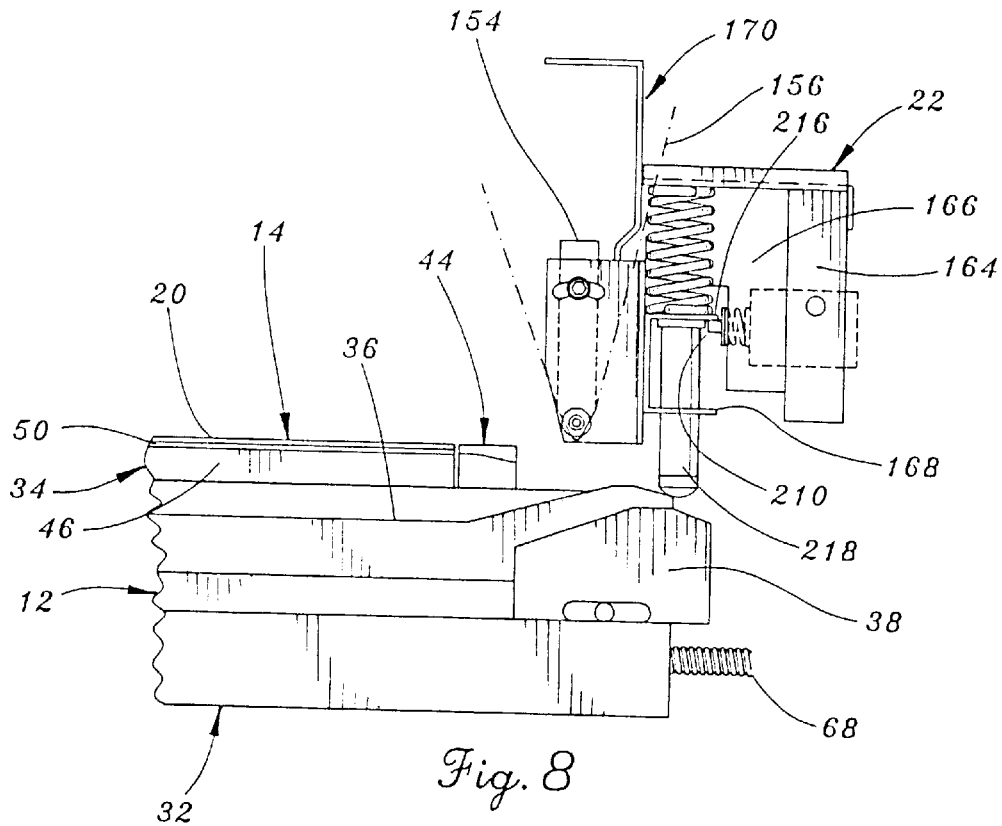
FIG. 8 is an enlarged side view of the carriage showing engagement of the cam followers with the cam surfaces on the carriage body.
Figure 9:
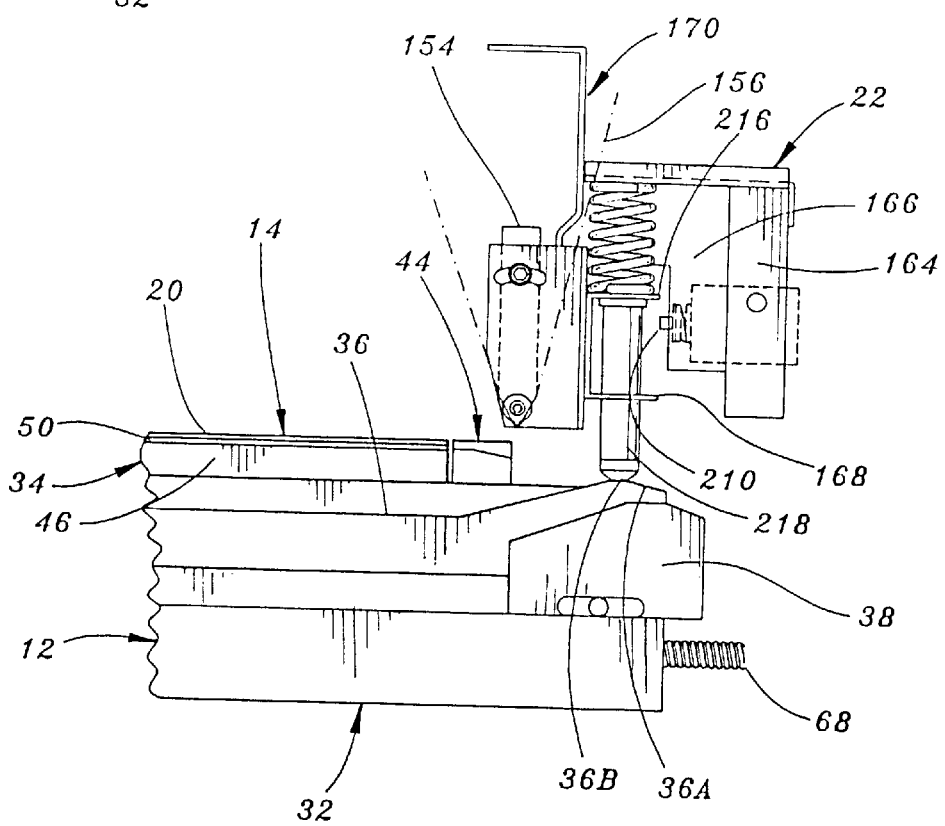
FIG. 9 is another view thereof showing the printhead assembly in a lifted position.
Figure 10:
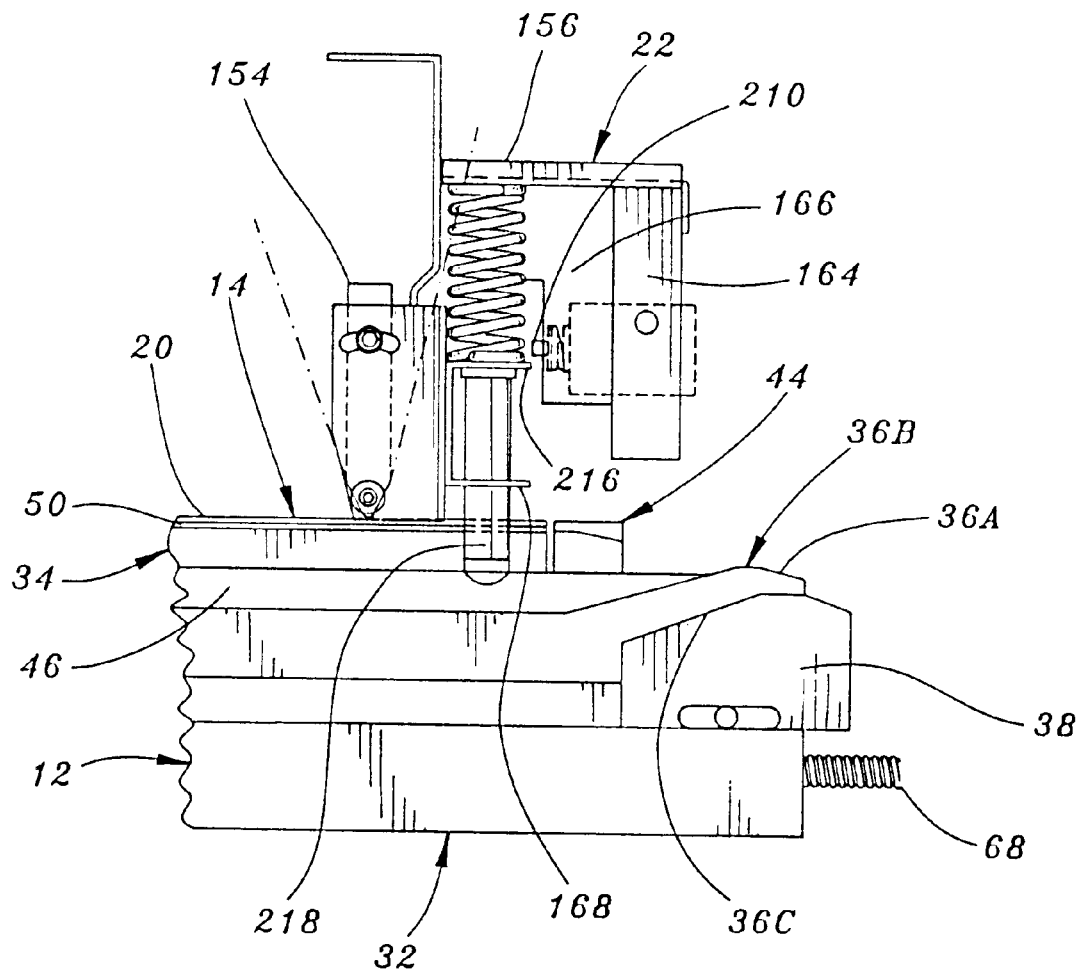
FIG. 10 is yet another view thereof showing the printhead assembly in engagement with the receptor card.

Movement of the printhead 154 between the idle position and the printing position is accomplished by means of spaced follower pins 218 mounted on the channel member 168. More specifically, the pins 218 extend through openings 220 in the channel member 168 and are secured by threaded nuts 222. The pins 218 are spaced so as to engage and ride on the cam surfaces 36 of the carriage 12. Referring to FIGS. 8, 9, and 10, a full printing cycle will now be described. In FIG. 8, the printhead 154 is shown in its normal idle position with the pins 218 positioned just forwardly of the cam surfaces 36. Turning to FIG. 9, forward movement of the carriage 12 causes the pins 218 to ride upwardly along the cam slope 36A forcing the channel member 168 (upper wall 216) upwardly out of engagement with the solenoid pin 210. At the apex 36B of the front cam surface 36 the solenoid 206 is energized to retract the pin 210 out of the way so that the channel member 168 can now move downwardly. Turning to FIG. 10, further forward movement of the carriage 12 causes the pins 218 to ride downwardly along the cam slope 36C to lower the printhead 154 into contact with the receptor surface 20 of the card 14. Further movement of the carriage 12 forwardly moves the printhead 154 along the surface 20 of the receptor card 14 to print an image thereon. The corresponding cam surfaces 36 at the rear of the carriage 12 lift the printhead 154 upwardly out of engagement with the receptor card 14. When the pins 218 are positioned at the apex 36B of the rear cam surface 36, the solenoid 206 is de-energized to release the plunger 208 wherein the spring 212 forces the capture pin 210 back to its normal extended position. Thus, when the pins 218 ride downwardly on the rear cam surface 36, the capture pin 210 re-catches the channel member wall 216 to maintain the printhead 154 in the idle position.

Since color printing is achieved by a three-pass printing process, the printing cycle must reoccur three successive times. Successive printing occurs by driving the carriage 12 forward and backward along the rails three consecutive times wherein the printhead 154 is successively lowered from the idle position into the printing position during forward movement of the carriage 12, and lifted to and maintained in the idle position during rearward movement of the carriage 12. More specifically, the carriage 12 is driven rearwardly back to a position to the left of the printhead 154, the transfer ribbon 156 is advanced to the next color panel, and then the carriage 12 is driven forwardly to print the second color. As stated previously, when the carriage 12 passes through the guide assembly 130, the guide assembly 130 repositions the card 114 to the rearwardmost position on the carriage 12 so that proper print registration may be maintained in successive passes.

Figure 12:
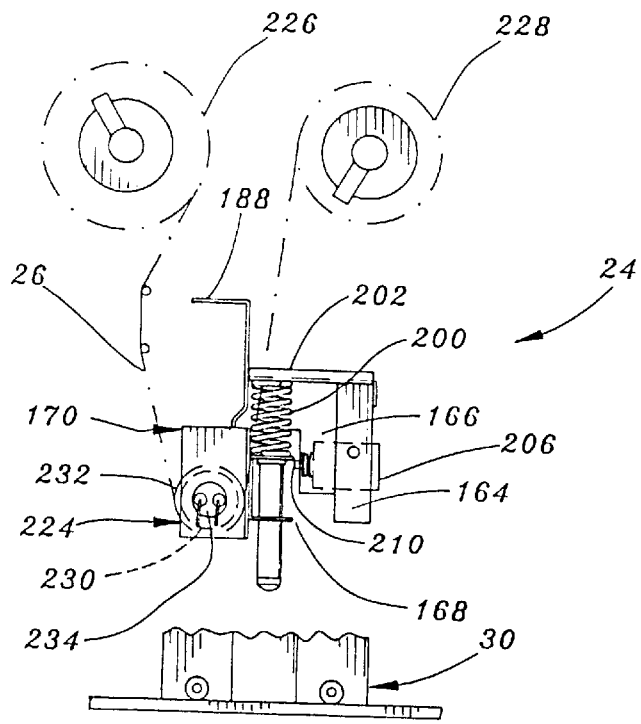
FIG. 12 is an enlarged side elevational view of the laminating assembly.

To laminate the printed card 14, the carriage 12 is moved further forwardly to transport the receptor card 14 beneath the laminating assembly 24. In this regard, a laminating film 26 passes intermediate a heated laminating roller assembly 224 and the receptor card 14 during the laminating operation for overlaying a clear or holographic protective overlay film onto the printed surface 20 of the card 14. The laminating film supply assembly comprises a supply roll 226, and a take-up roll 228 which is driven by a conventional stepper motor (not shown). It is pointed out that a second guide assembly 130 (FIG. 1) is positioned between the printhead assembly 22 and the laminating assembly 24 to insure proper positioning of the receptor card 14 when entering the laminating assembly 24. The laminating assembly 24 is basically identical in structure and function to the printhead assembly 22 except that instead of a printhead mounted on the carrier assembly 170, a heated laminating roller assembly 224 is mounted on the carrier 170. The laminating roller assembly comprises a hollow steel shaft 230 (broken lines FIG. 12) rotatably mounted to the carrier 170, and a resilient outer surface cover 232. A conventional cartridge-type heater 234 is inserted into the center of the hollow shaft 230 to heat the roller assembly 224 to the desired temperature for the laminating film 26. The roller assembly 224 is lifted and lowered onto the surface 20 of the receptor card 14 in the same manner as the printhead 154, with the exception that the follower pins 218A ride on the outer cam block surfaces 39 to effect upward and downward movement of the roller assembly 224. In other words, the pins 218A are spaced slightly farther apart on the roller mounting assembly. Furthermore, the pins 218A are slightly longer to accommodate the lower positions of the cam surfaces 39. However, the pins 218A and cam surfaces 39 function virtually identical to the printhead assembly for lifting and lowering of the laminating roller assembly 224.

Referring now to FIGS. 13–16, the carriage 12 then transports the receptor card 14 to a pair of output nip rollers generally indicated at 236 via exit channel assembly 28. It is noted that the heat applied to the upper surface 20 of the card 14 stresses the plastic, and causes it to curve upwardly. The exit channel assembly 28 effectively maintains the card 14 in a relatively flat configuration while passing the card 14 to the output rollers 236. In this regard, the upper nip roller 238 comprises a conventional solid roller, while the lower nip roller generally indicated at 240 comprises a hollow steel shaft 242, having a resilient outer surface coating 244. A conventional cartridge-type heater 246 is inserted into the hollow shaft 242 to heat the roller assembly 240 and apply heat to the lower surface 248 of the receptor card 14. Heating of the lower surface 248 of the card 14 balances the thermal stresses on the plastic so that the card 14 exits the apparatus 10 in a substantially flat configuration.

Figure 13:
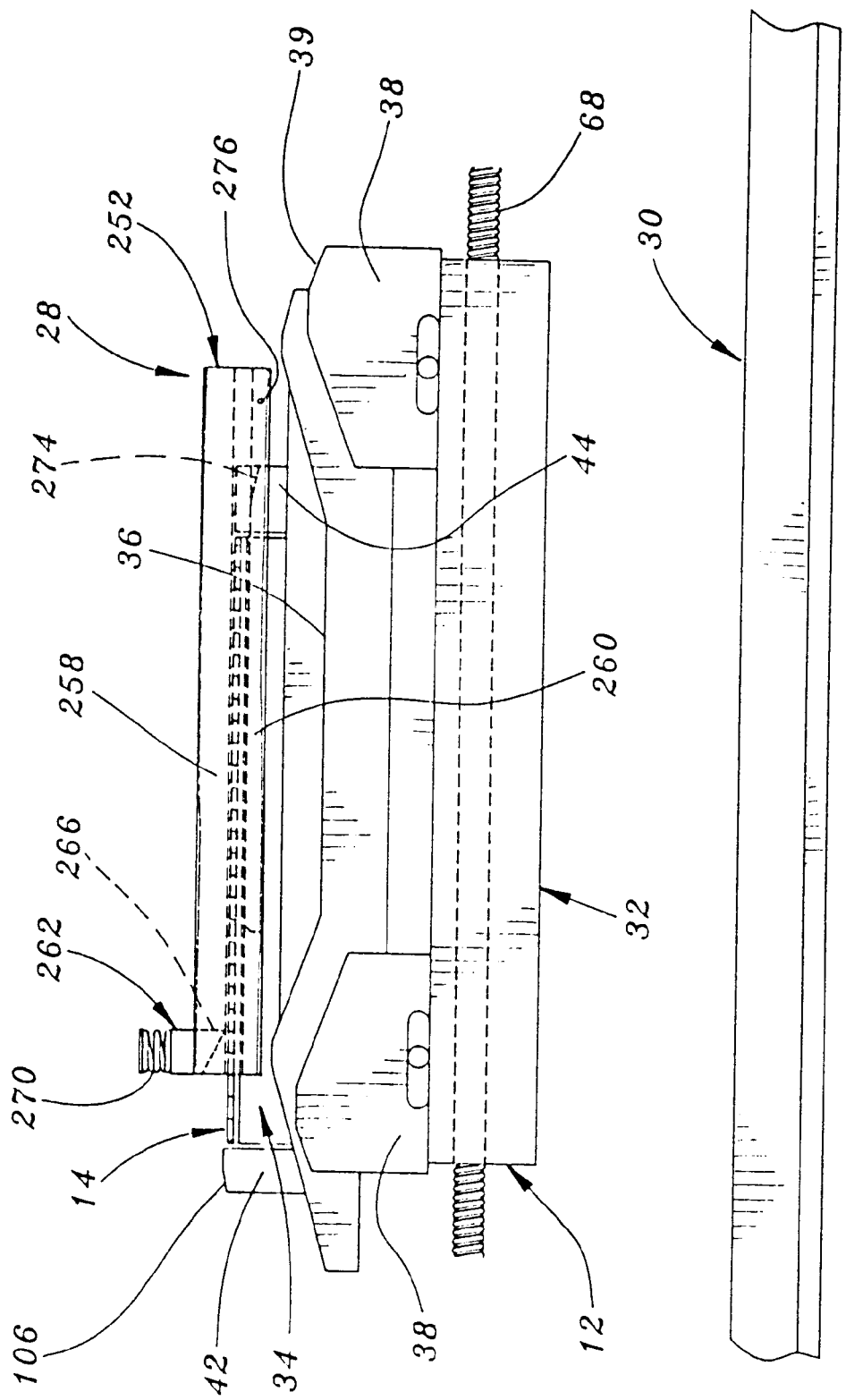
FIG. 13 is an enlarged side view of the transport carriage guiding the receptor card into the exit station.
Figure 14:
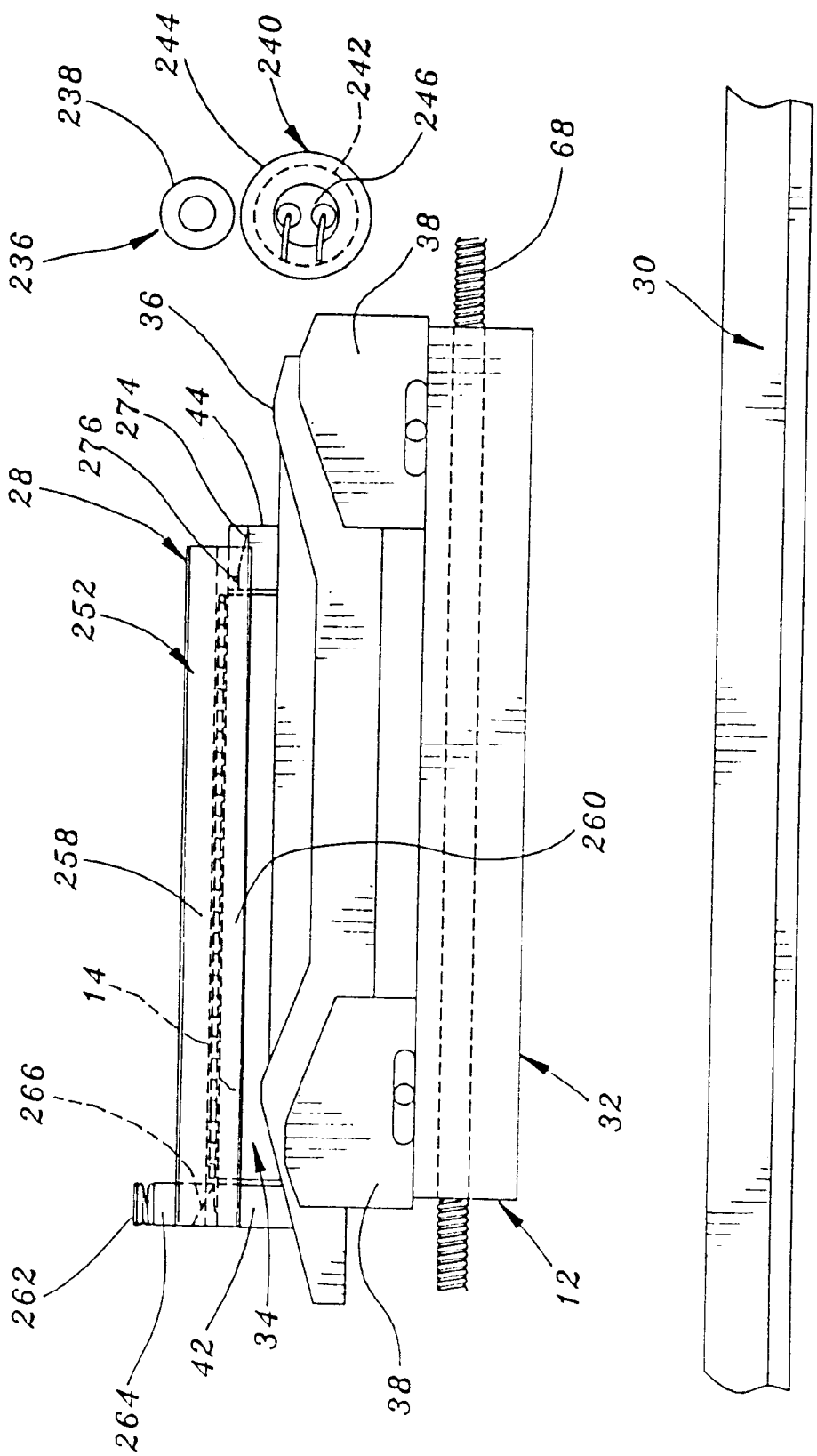
FIG. 14 is an other view thereof showing the stop block depressed and the card ready for exit.
Figure 15:
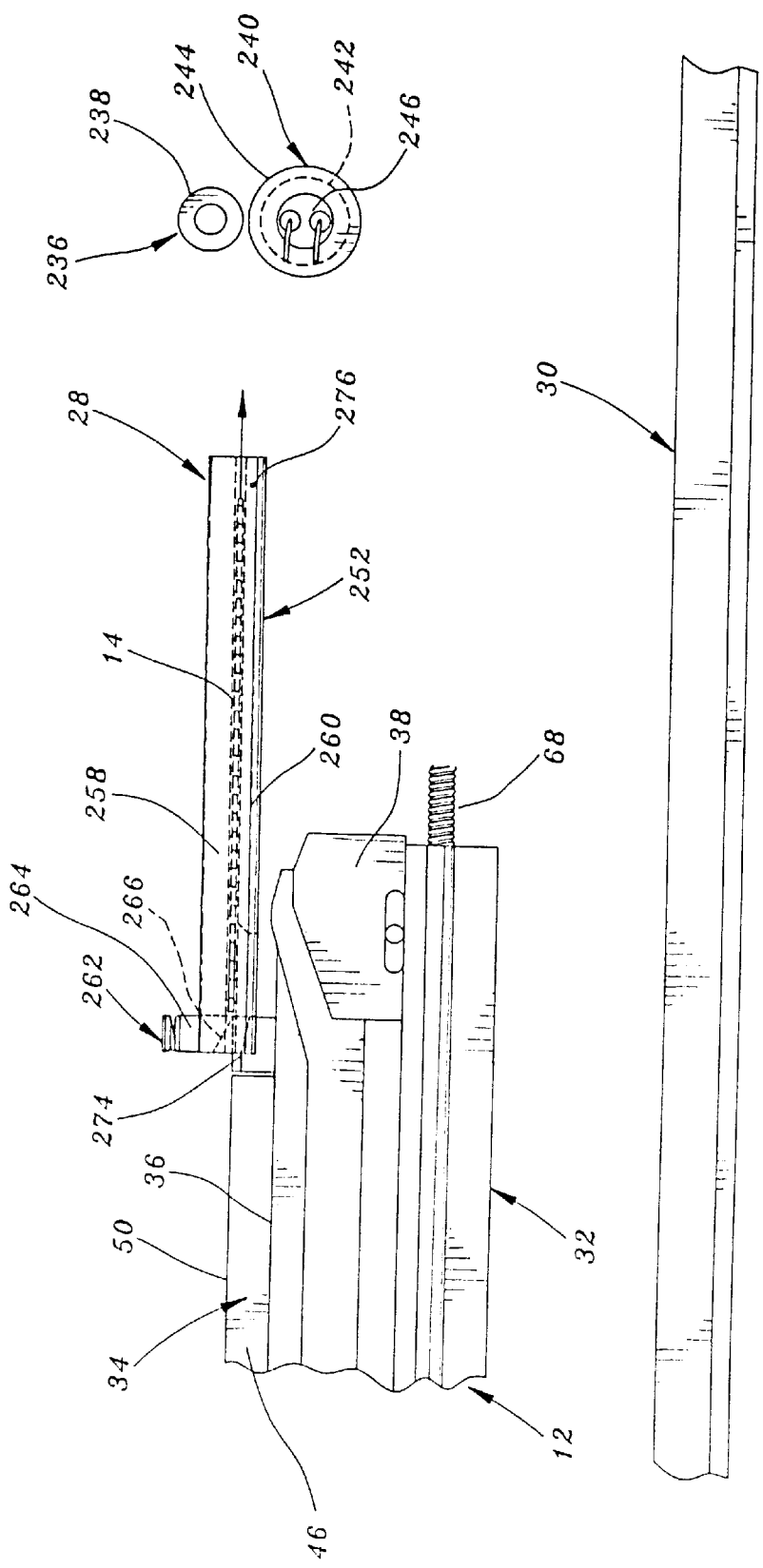
FIG. 15 is yet another view thereof showing the carriage retracted and ready to push the receptor card outwardly through the nip rollers.
Figure 16:
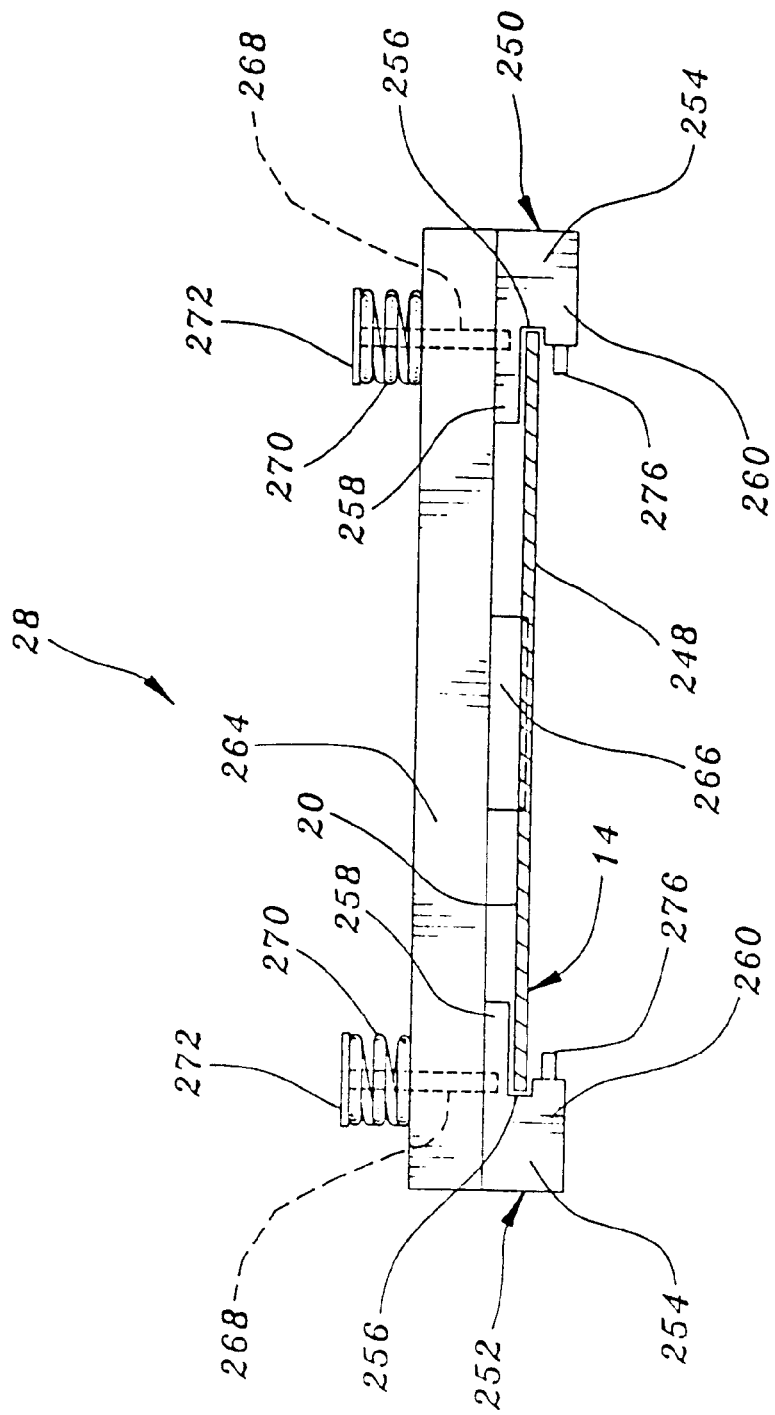
FIG. 16 is a cross-sectional view thereof taken along line 16—16 of FIG. 15.
Figure 17:
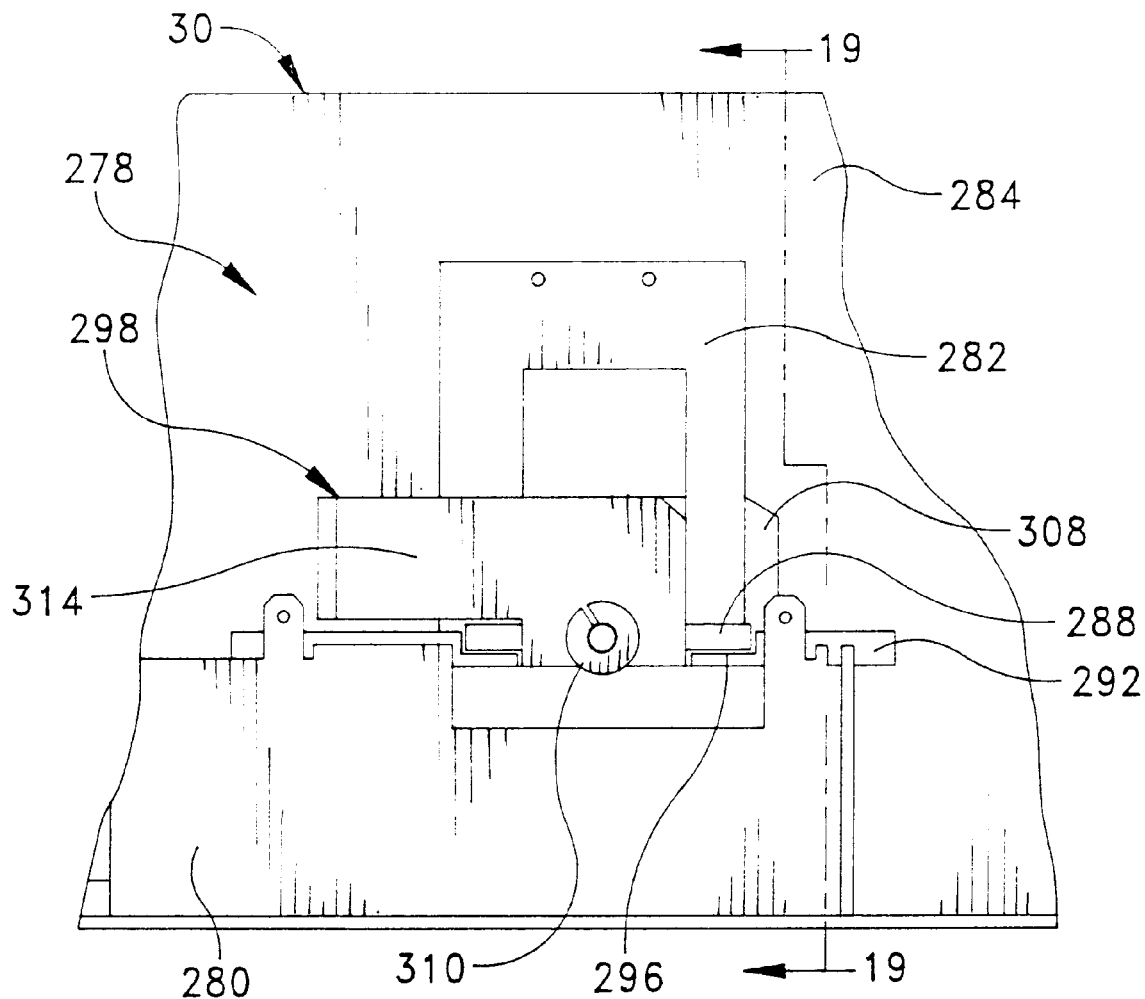
FIG. 17 is a side elevation view of the flip station as described in accordance with a second embodiment of the invention.
Figure 18:
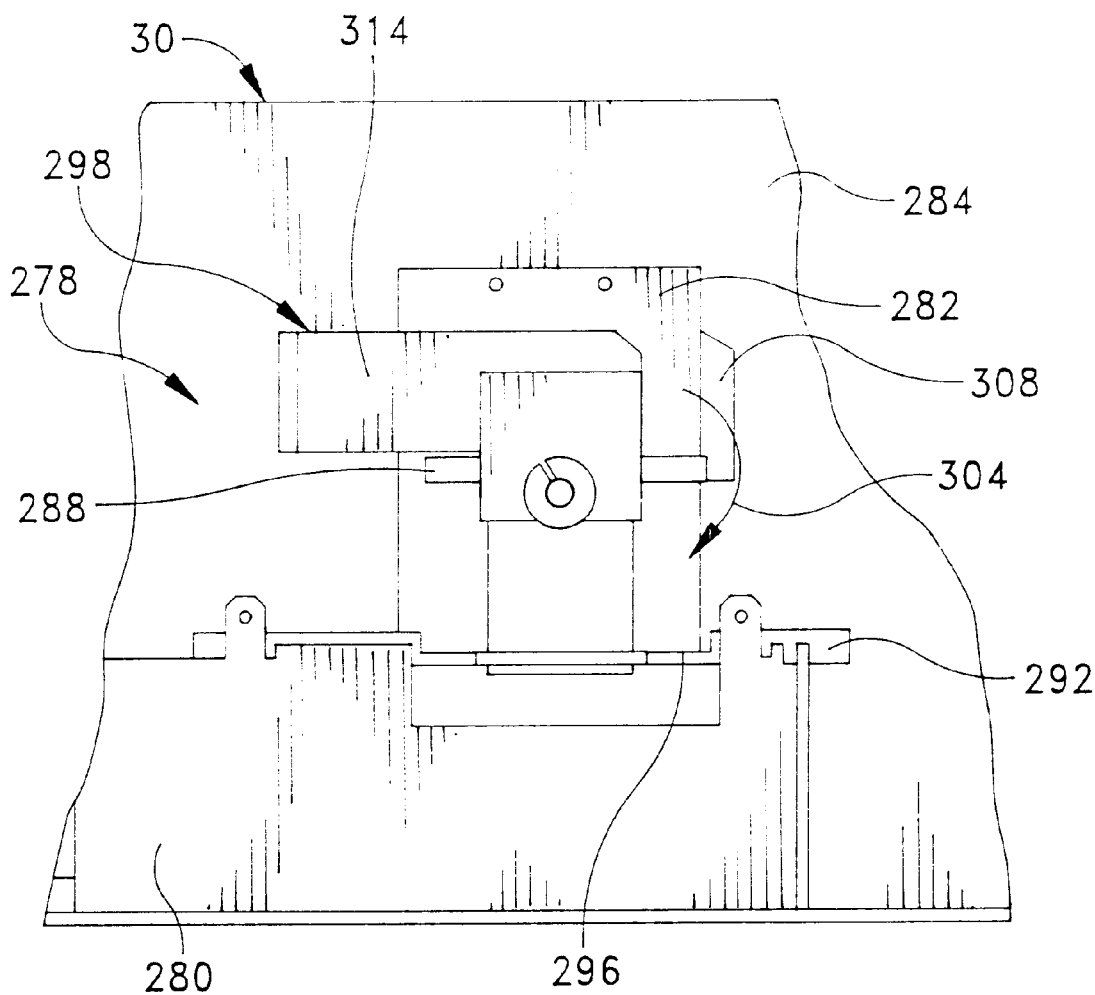
FIG. 18 is another side elevation view of the flip station showing the lifting mechanism in an upward position.
Figure 19:
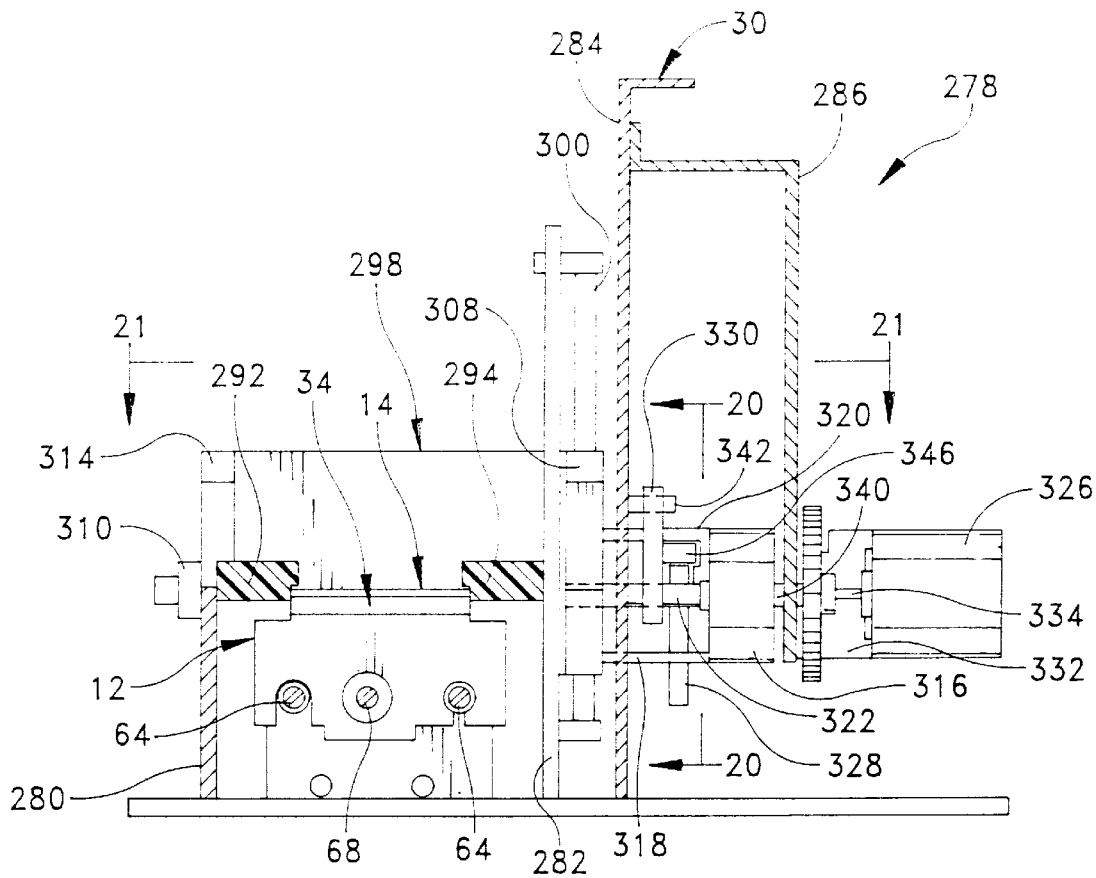
FIG. 19 is a cross-sectional view thereof taken along line 19—19 of FIG. 17.
Figure 20:
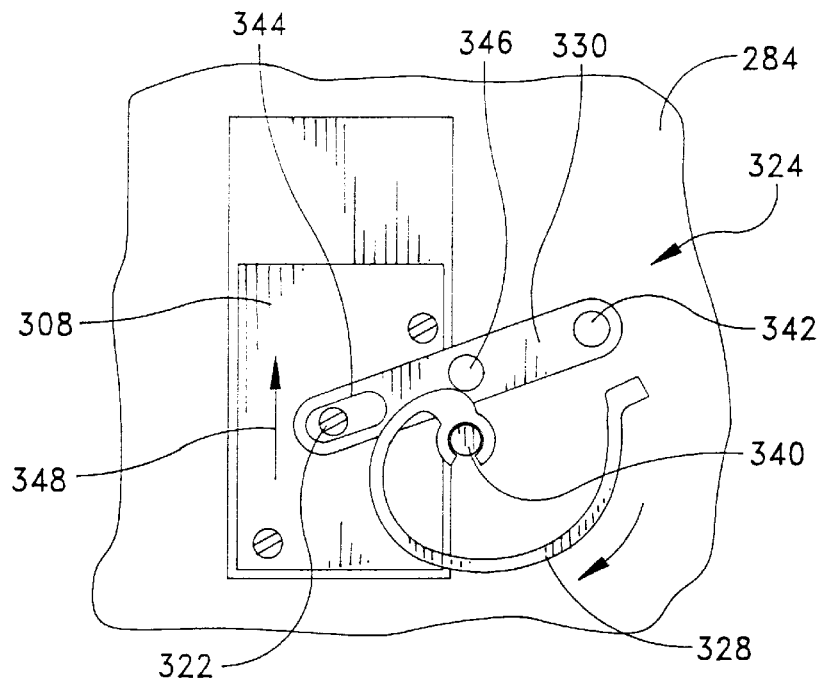
FIG. 20 is a partial cross-sectional view taken along line 20—20 of FIG. 19 showing the cam and follower arrangement.
Figure 21:
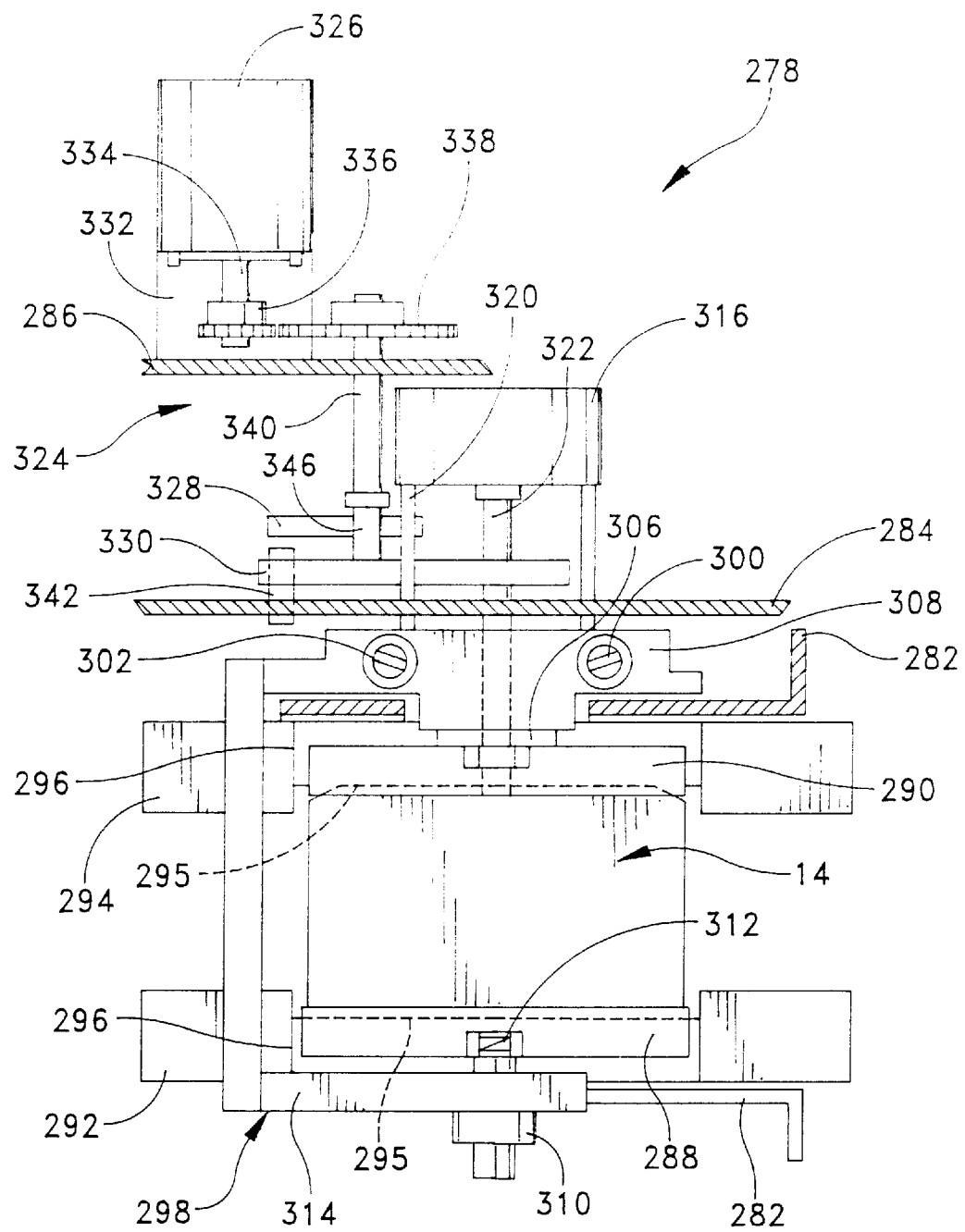
FIG. 21 is a cross-sectional view taken along line 21—21 of FIG. 19.

Still referring to FIGS. 13–16, the exit channel assembly 28 comprise inner and outer fixed channel members 250, 252. The channel members 250, 252 each comprise a body portion 254 having a vertical edge surface 256 for engaging the side surfaces of the card 14, and an upper ledge 258 for engaging the upper surface 20 of the card 14. The channel members 250, 252 further include a lower ledge portions 260 for engaging the lower surface 248 of the card 14. The upper and lower ledges 258 260 cooperate to maintain the card 14 in a relatively flat configuration after being removed from the surface of the card platen 34. Turning to FIG. 13, the carriage 12 is driven forwardly to position the card between the exit channels 250, 252. A picking member generally indicated at 262 disposed at the rear end of the exit channels 250, 252 rides on top of the receptor surface 20 of the card 14 until the card 14 is fully positioned within the exit channels 250, 252. The picking member 262 comprises a bar 264 which extends laterally between the two channel members 250, 252. The center of the bar 264 includes a downwardly extending chamfered pick 266. The bar 264 is mounted to the channel members 250, 252 by threaded fasteners 268 which pass through openings in the bar 264 and into threaded bores in the top of the channel members 250, 252. Springs 270 are captured between the heads 272 of the threaded fasteners 268 and the bar member 264 to normally bias the bar 264 and pick 266 downwardly. As the card 14 passes underneath the pick 266, the pick 266 rides on top of the card 14. However, when the pick 266 reaches the end of the card surface (FIG. 14) it drops down into a position wherein it engages the rear edge of the card 14. Simultaneously, cam surfaces 274 on the side edges of the stop block 44 engage with pins 276 extending inwardly from the lower ledges 260 of the exit channel members 250, 252. The pins 276 ride on the cam surfaces 274 and force the stop block 44 downwardly into the recess 54 so that the front edge of the card 14 is no longer obstructed for forward movement. Turning to FIG. 15, the carriage 12 is then driven rearwardly, with the card 14 remaining in position due to the pick 266 engaged with the rear edge thereof. Once the carriage 12 is driven rearwardly, the pins 276 disengage the cam surfaces 274 of the stop block 44 which then moves back to its normal upwardly extending position. In this regard, the stop block 44 rides along the bottom surface 248 of the card 14 until it reaches the rear edge of the card 14, wherein the stop block 44 extends further upwardly to be positioned for engagement with the rear edge of the card 14. Thereafter, the carriage 12 is driven forwardly again, the forward edge of the stop block 44 engaging the rear edge of the receptor card 14 to push the card 14 forwardly until the card 14 is captured between the nip rollers 236 which then grab the card 14, heat the lower surface thereof 248 and pass it out of the apparatus 10.

While the above-described apparatus is highly effective for printing on a single surface of the card, it has been found in the industry that it would also be advantageous in certain applications to be able to print on both the front and back surfaces of the card. For example in creating identification cards, it is preferable to be able to print information on both the front and back surfaces of the card. Accordingly, in an alternate embodiment of the apparatus, the transport system further includes a flip station generally indicated at 278 for reversing, or flipping the card 14 by 180 degrees, after a first printing operation, so that printing can also be accomplished on the reverse side of the card 14. In this regard, the flip station 278 is preferably located between the printing station 22 and the lamination station 24 so that the card 14 can be flipped over after a printing operation and then fed back into the printer 22 for a second printing operation. Referring to FIG. 1 the flip station 278 would therefore be located in the position of the guides 130, thereby replacing the guide 130.

Referring now to FIGS. 17–21, the flip station 278 is generally operative for lifting the receptor card 14 off of the supporting plate carriage 12, rotating the receptor card 180 degrees to reverse the exposed surface and for returning the receptor card 14 back onto the carriage 12 whereby the opposing surface of the receptor card 14 is presented for receiving a printed image thereon. More specifically, the flip station 278 comprises a frame assembly defined by four parallel retaining walls 280, 282, 284, and 286, and further comprises a pair of spaced retaining channels 288, 290 which are operative for engaging the side edges of the card 14 when the carriage 12 is driven beneath the flip station 278. Consistent with the construction of the above-described print station 22, the retaining walls 280, 282 straddle the carriage drive assembly so that the carriage 12 passes directly beneath the flip station 278. As the carriage 12 enters the flip station 278, the card 14 is guided by a pair of guide channels 292, 294 similar to the guide channels 130 which have been replaced. The guide channels 292, 294 guide the card into position between the two retaining channels 288, 290 so that the side edges of the card 14 are received between the retaining edges 295 (shown in broken lines FIG. 21) of the retaining channels 288, 290. The retaining channels 288, 290 are received into recesses 296 in the guide channels 292, 294. The retaining channels 288, 290 are rotatably supported on a U-shaped block assembly generally indicated at 298 which is guided for vertical movement on a pair of vertical guide rails 300, 302. More specifically, the block assembly 298 is movable between a normal lower vertical position (FIG. 17) wherein the receptor card 14 is received between the retaining channels 288, 290 and rests on the receiving surface 34 of the carriage 12, and a second upper vertical position (FIG. 18) wherein the receptor card is sufficiently spaced from the carriage 12 to permit a 180 degree rotation (See arrow 304 FIG. 18). The inner retaining channel 290 is mounted on a fixed bearing assembly 306 so that it is operable for rotation relative to the inner wall 308 of the block assembly 298. In contrast, the outer retaining channel 288 is mounted on a bearing 310 and includes a spring 312 so that the outer retaining channel 288 is simultaneously biased inwardly with regard to the outer wall 314 of the block assembly 298. The inward bias provides the necessary retention force to maintain the card 14 in engaged relation with the retaining channels 288, 290.

The retaining channels 288, 290 are rotated through a 180 degree rotation by means of a stepper motor 316 associated with the block assembly 298. The stepper motor 316 is fixedly mounted to the inner wall 308 of the block assembly 298 by two stanchions indicated at 318, 320. The drive shaft 322 of the motor 316 passes through a bore in the inner wall 308 of the block assembly 298 wherein the terminal end of the shaft 322 is fixedly connected to the inner retaining channel 290. Rotation of the drive shaft 322 positively drives rotation of the inner retaining channel 290 through a 180 degree rotation. The outer retaining channel 288 simply moves along with the inner channel 290 due to engagement of the card 14 between the retaining channels.

Vertical movement of the block assembly 298 is guided on the vertical guide rails 300, 302 which are mounted to retaining wall 282 and pass through slide bearings mounted in the inner wall 308 of the block assembly 298. To accomplish movement of the block assembly 298 between the lower and upper positions, the flip station 278 further comprises a cam assembly generally indicated at 324. The cam assembly 324, best illustrated in FIG. 20, includes a drive motor 326, a cam 328 and a follower arm 330. The drive motor 326 is mounted on a bracket 332 attached to retaining wall 286 and includes a drive shaft 334 and a pinion gear 336. The pinion gear 336 drives a reduction gear 338 mounted on a shaft 340. The cam 328 is keyed to the shaft 340 for rotation responsive to rotation of the motor 326. The follower arm 330 is pivotably mounted to retaining wall 284 by pin 342 at one end thereof, while the second end includes a slot opening 344. The drive shaft 322 of the retaining channel motor 316 passes through this opening 344 in the free end of the follower arm 330. The central portion of the following arm 330 includes a follower pin 346 which rides on the outer surface of the cam 328. Accordingly, rotation of the drive shaft 334 and pinion 336 causes rotation of the reduction gear 338, shaft 340, and cam 328. Rotation of the cam 328 forces the follower arm 330 upwardly (see Arrow 348 FIG. 20). Since shaft 322 passes through the slot opening 344 in the end of the follower arm 330, and the shaft is keyed to the block assembly 298, the entire block assembly 298 is moved upwardly with the shaft 322. The apparatus 10 is automatically programmed to engage rotation of the retaining channels 288, 290 when the block assembly 298 is in the upper position (FIG. 18) thereby reversing or flipping the card 14 over. Reverse rotation of the cam motor 326 will then lower the block assembly 298 back to the first or lower position (FIG. 7) with the opposing surface of the card 14 now exposed for printing.

In use of the alternate apparatus, the exposed card surface would be printed in a first printing operation using a single color, such as black to create a back surface of the card. To accomplish printing in black, the thermal transfer ribbon 156 is provided with an additional black panel located between each set of successive color panels. As the card 14 exits the printing station 22, the card 14 is fed into the flip station 278 for reversing the exposed surface of the card 14. More specifically, the carriage 12 moves the card 14 between the opposing retaining channels 288, 290 which are biased inwardly to grasp the opposing side edges of the card 14. The block assembly 298 is then lifted upwardly by the cam mechanism 324 thereby lifting the card 14 off of the receiving surface 34 of the carriage 12. When the block assembly 298 is in an upper position, the retaining channels 288, 290 are rotated 180 degrees by stepping motor 316 to reverse the sides of the card 14. The block assembly 298 is the lowered back into the normal in-line position wherein the card 14 is returned to the receiving surface 34 of the carriage 12 with the unprinted surface of the card 14 now facing upwardly. The carriage 12 is then driven back through the printing station 22 three successive times to achieve a full color print image on the now exposed surface of the card 14 thereby creating a front surface of the card 14. The card 14 is then passed through the laminating station 24 in normal fashion to laminate the front surface of the card 14. The card 14 is thereafter output to the user.

It can therefore be seen that the instant invention provides a novel and effective means for transporting a receptor card 14 through successive stations in a printing and laminating apparatus. The threaded rod driven carriage 12 effectively holds the card 14 in a predetermined position, and precisely moves the card 14 beneath the printing station 22 for accurate three-pass color printing. The cleaning station 18 effectively cleans the surface 29 of the receptor card 14 prior to printing to provide a clean receptor surface 20 for printing. The cam and follower assemblies effectively lower the printing and laminating devices for engagement with the surface of the receptor card 14 during forward movement of the carriage 12 and lift the printing and laminating assemblies for movement of the carriage 12 to the starting position. Furthermore, the flip station 278 provides an effective means for reversing the exposed surface of the card, so that printing can be achieved on both front and back surfaces of the card. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the claims.

What is claimed is:

1. Card printing apparatus operable for printing both front and back surfaces of a receptor card comprising:

print means for printing an image on an upwardly facing surface of a receptor card during a printing operation; and a linear transport system for linearly transporting said receptor card beneath said print means during a printing operation, said linear transport system including a carriage for receiving said receptor card with one of said front and back surfaces facing upwardly for receiving an image thereon, linear guide means for linearly guiding said carriage beneath said print means during said printing operation, and reversible drive means for reversibly driving said carriage along said linear guide means, said linear transport system further including means for lifting the receptor card off of the carriage, means for rotating the receptor card 180 degrees, and means for returning the receptor card onto the carriage, whereby the other of the front and back surfaces of the receptor card is presented for receiving a printed image thereon.

2. The card printing apparatus of claim 1 wherein said means for lifting the receptor card off of the carriageand for returning the receptor card to the carriage comprises:

a pair of spaced retaining channels which are supported on a block assembly, said retaining channels being biased inwardly with respect to said block assembly to resiliently engage the side edges of the receptor card when the card is received therebetween, said block assembly being guided for linear vertical movement with respect to said carriage by a pair of vertical guide rails which pass through said block assembly, said means for lifting the receptor card further comprising means for moving the block assembly along the vertical guide rails between a first vertical position wherein the receptor card is positioned on the surface of the carriage to a second vertical position wherein the receptor card is sufficiently spaced from the carriage to permit a 180 degree rotation.

3. The card printing apparatus of claim 2 wherein said means for moving said block assembly along said vertical guide rails comprises:

a rotatable cam surface, and a follower pin mounted to said block assembly wherein said follower pin rides on the rotatable cam surface, said means for moving said block assembly further comprising means for reversibly rotating said cam surface between a first cam position corresponding to said first vertical position of said block assembly and a second cam position corresponding to said second vertical position of said block assembly.

4. The card printing apparatus of claim 2 wherein said retaining channels are rotatably mounted to said block assembly, said means for rotating said receptor card 180 degrees comprising motor means coupled to said rotatable retaining channels for selectively rotating said retaining channels respective to said block assembly.

5. The card printing apparatus of claim 3 wherein said retaining channels are rotatably mounted to said block assembly, said means for rotating said receptor card 180 degrees comprising motor means coupled to said rotatable retaining channels for selectively rotating said retaining channels respective to said block assembly.

* * * * *